July 16, 1929.  H. R. WARREN  1,721,423
SEED SEPARATING METHOD AND APPARATUS
Filed Dec. 15, 1927  9 Sheets-Sheet 1

Inventor
Harry R. Warren
by Cameron, Kerkam & Sutton
Attorneys

July 16, 1929.  H. R. WARREN  1,721,423
SEED SEPARATING METHOD AND APPARATUS
Filed Dec. 15, 1927    9 Sheets-Sheet 2
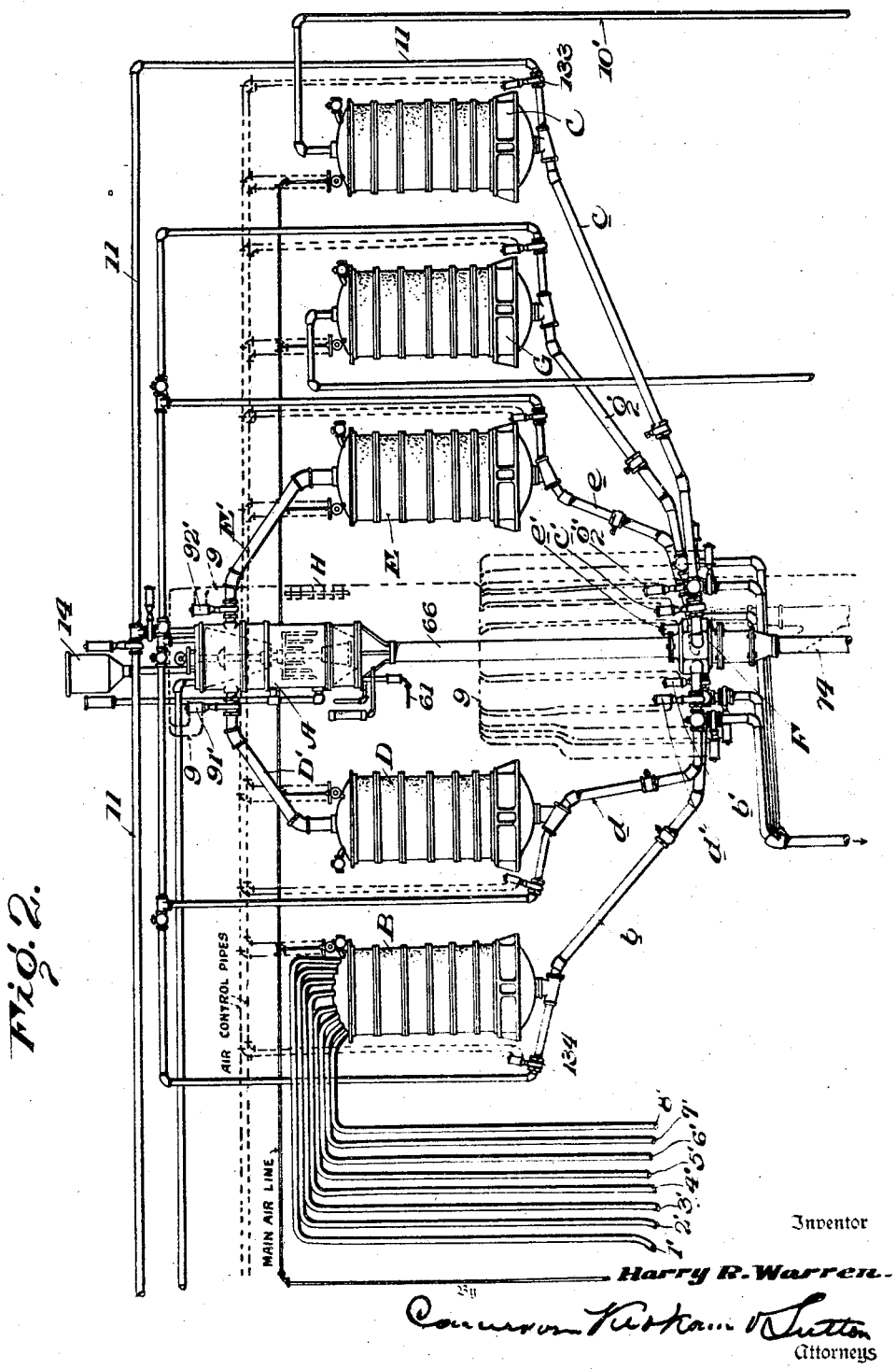
Inventor
Harry R. Warren
Attorneys July 16, 1929. H. R. WARREN 1,721,423
SEED SEPARATING METHOD AND APPARATUS
Filed Dec. 15, 1927  9 Sheets-Sheet 3
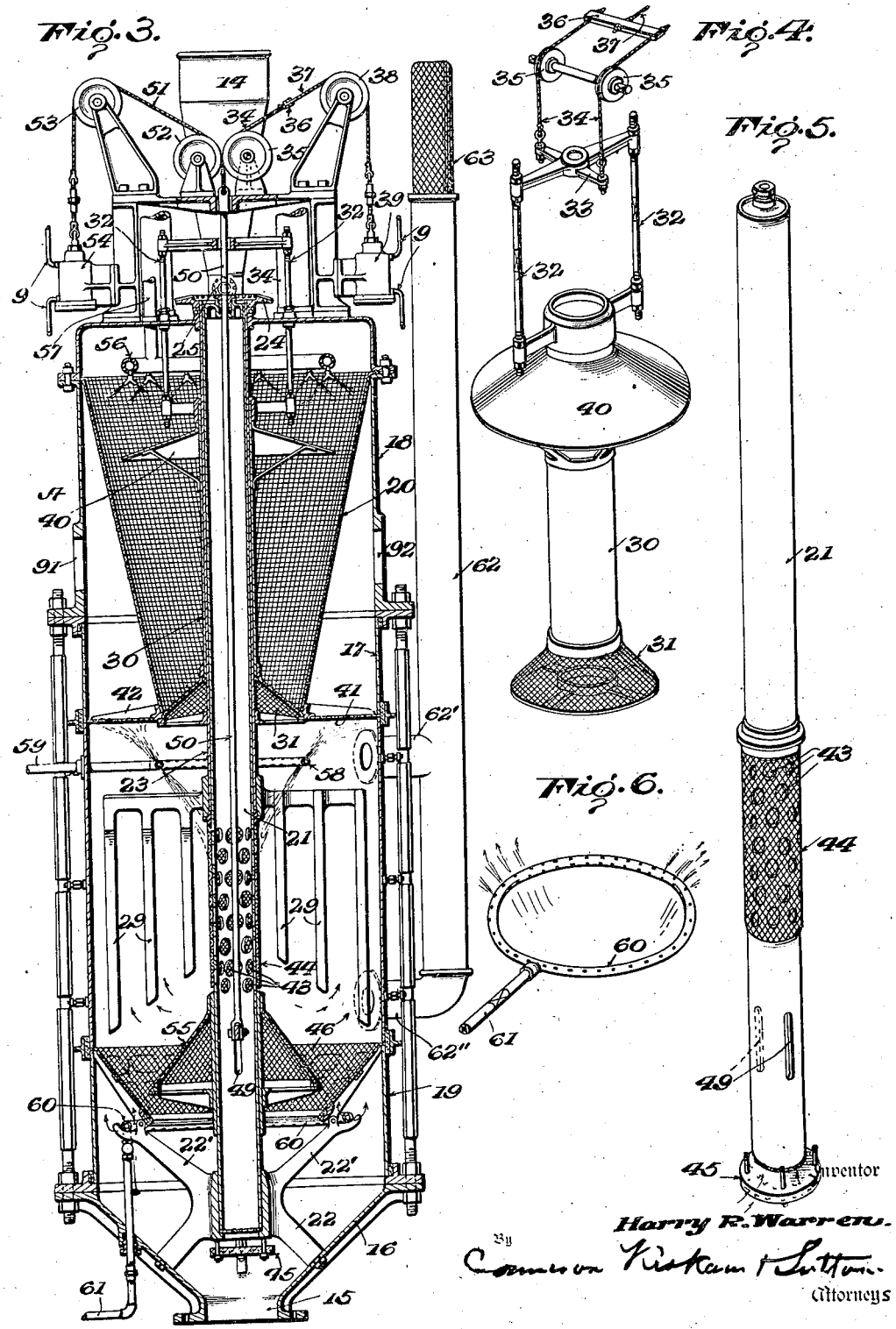

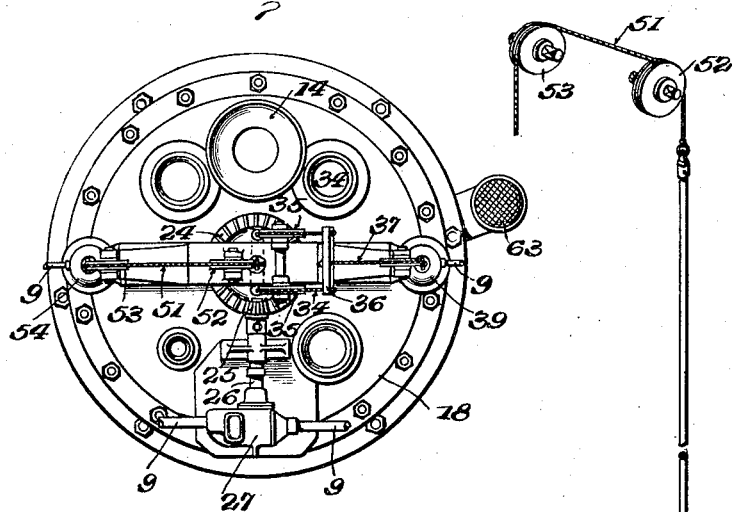
Fig. 7.
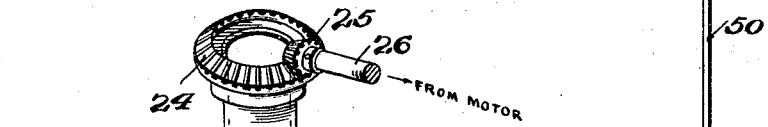
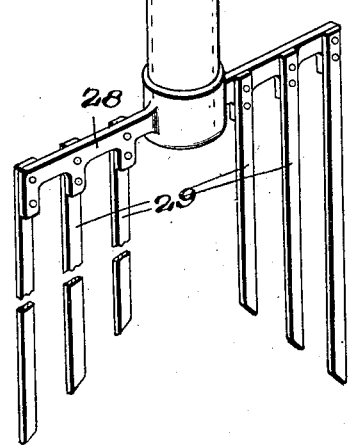
Fig. 9.
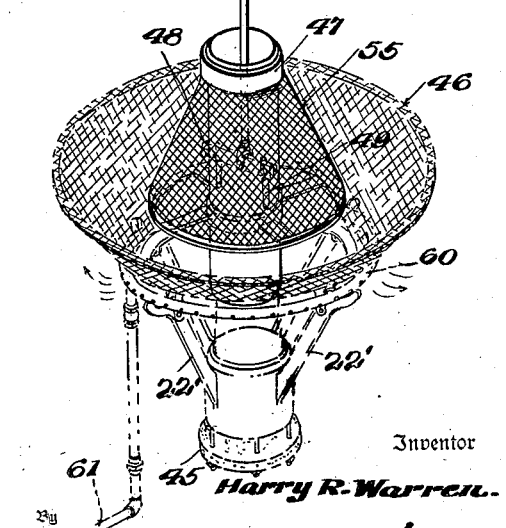
Fig. 8.
Inventor
Harry R. Warren
Attorneys

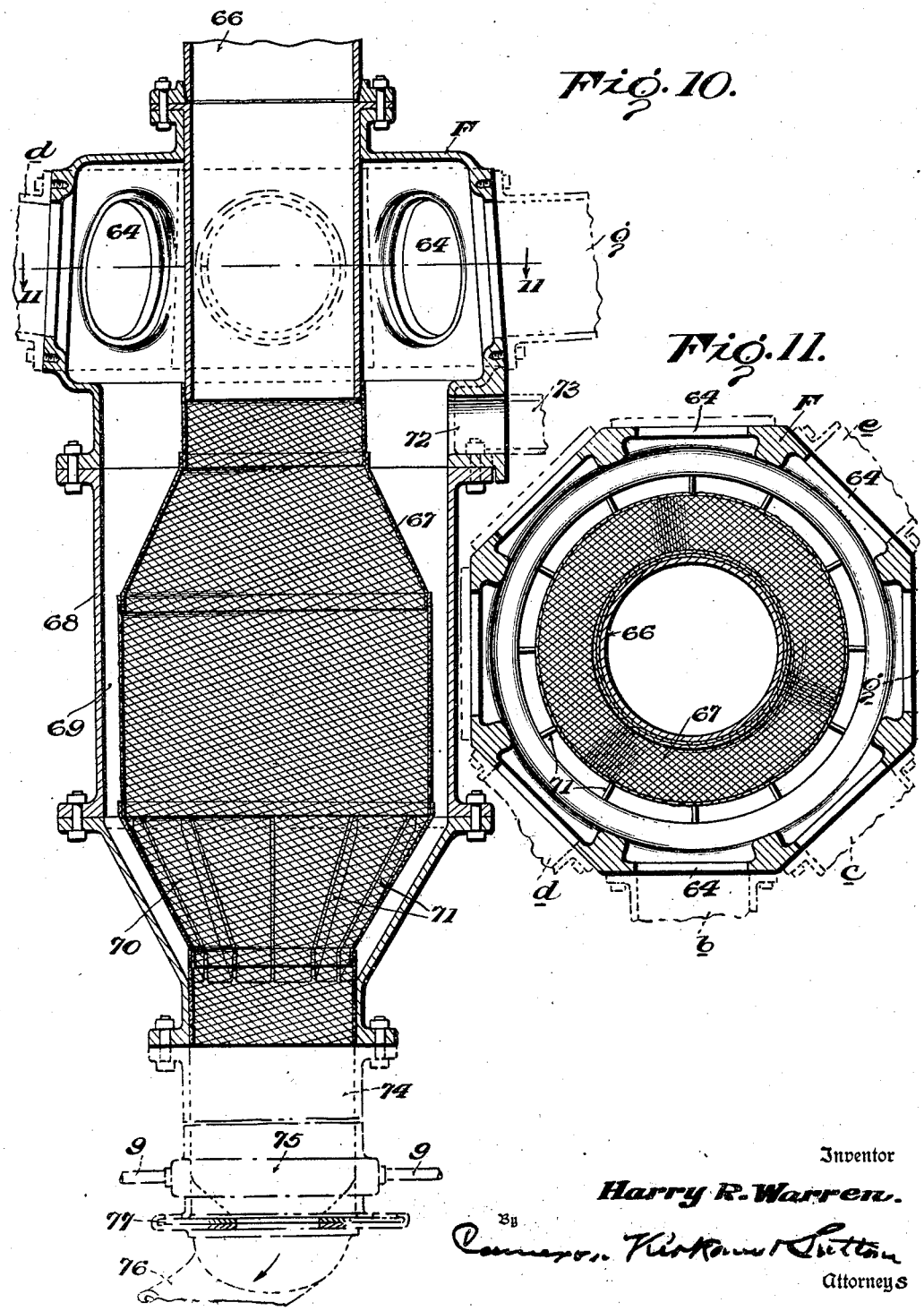

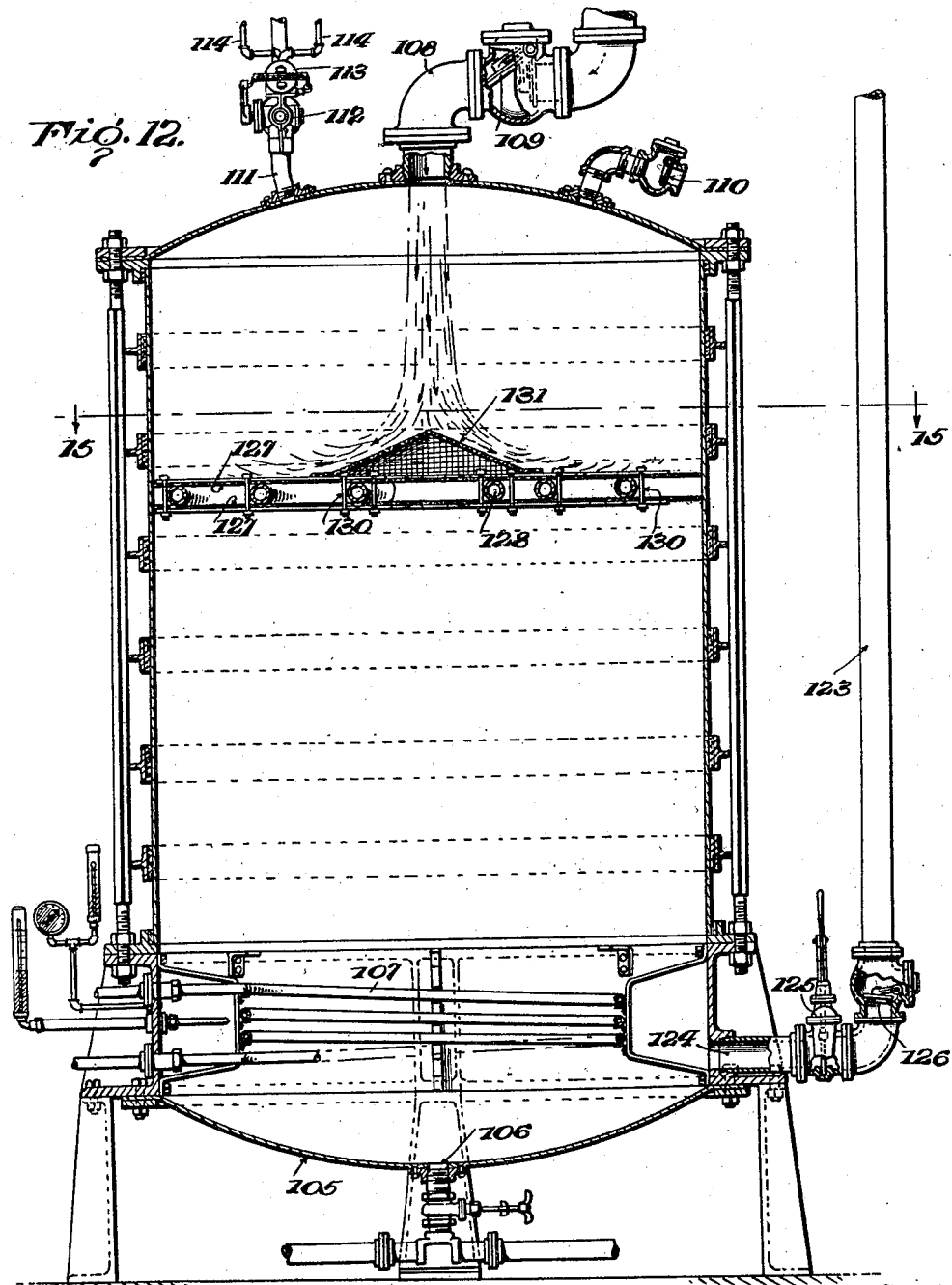

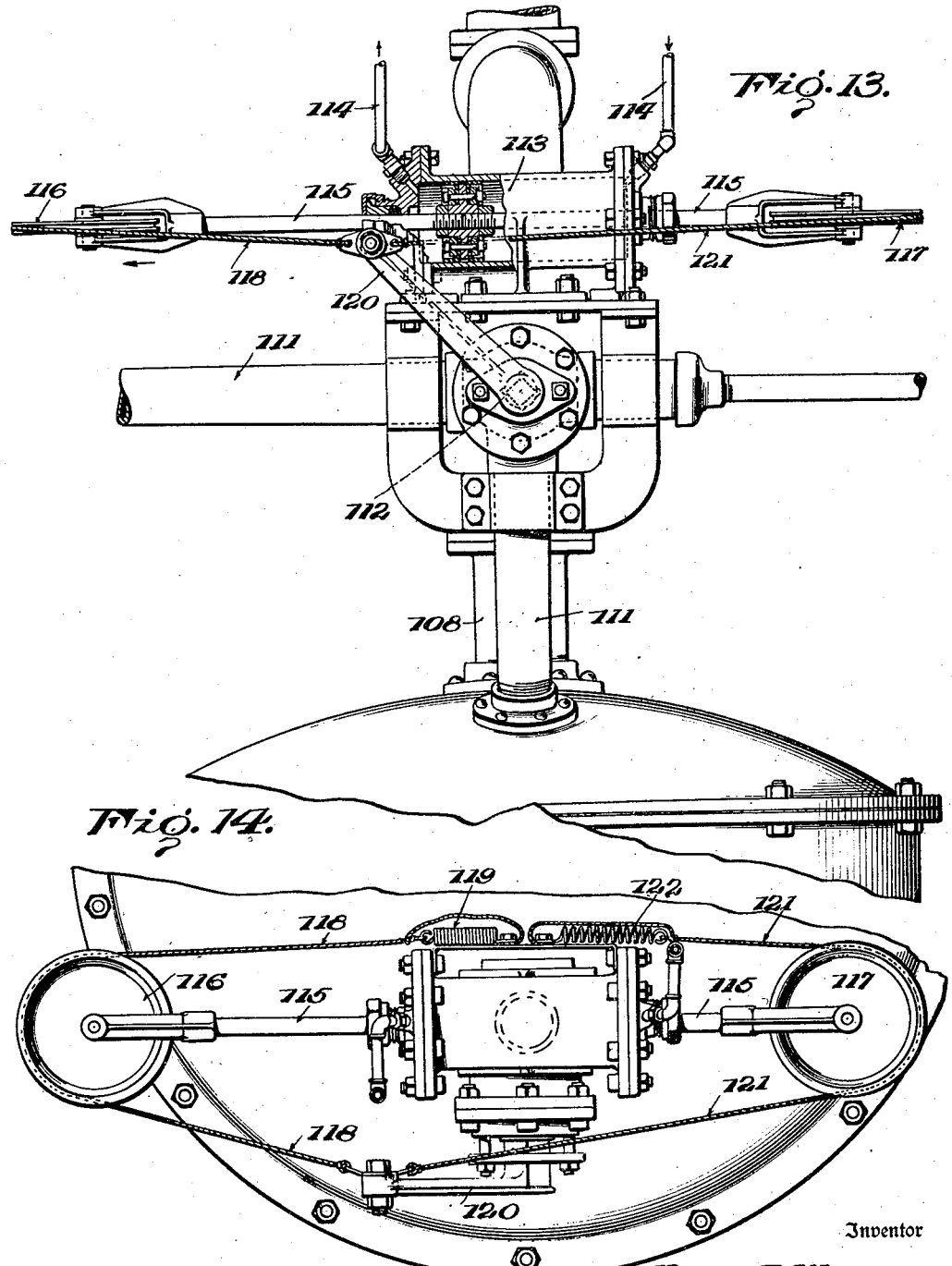

July 16, 1929.  H. R. WARREN  1,721,423

SEED SEPARATING METHOD AND APPARATUS

Filed Dec. 15, 1927  9 Sheets-Sheet 8

Inventor

Harry R. Warren.

By Cameron, Kerkam & Sutton

Attorneys

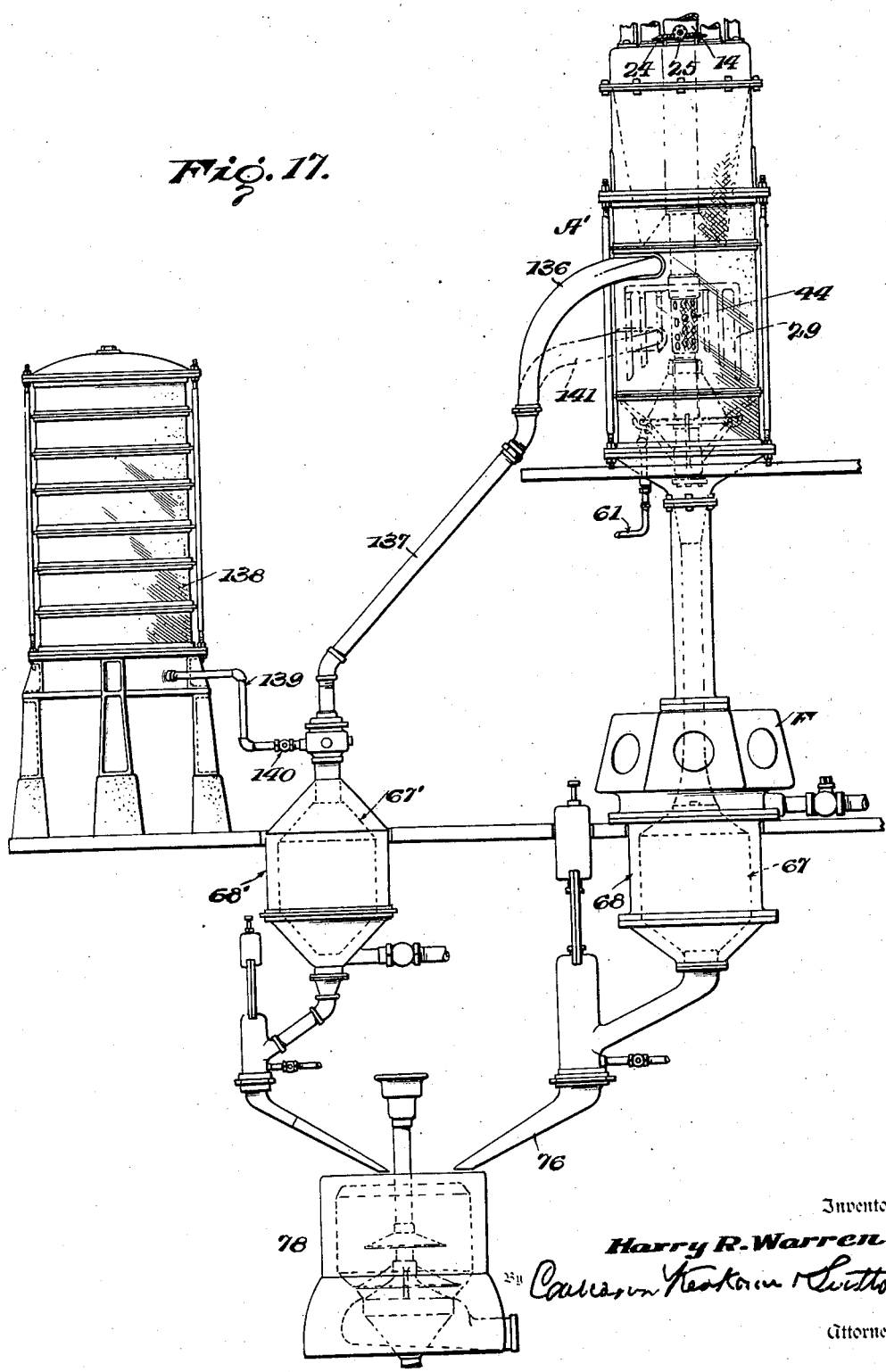

Patented July 16, 1929.

1,721,423

UNITED STATES PATENT OFFICE.

HARRY R. WARREN, OF CHICAGO, ILLINOIS, ASSIGNOR, BY MESNE ASSIGNMENTS, TO WARREN-TEED SEED COMPANY, OF CHICAGO, ILLINOIS, A CORPORATION OF NEVADA.

SEED-SEPARATING METHOD AND APPARATUS.

Application filed December 15, 1927. Serial No. 240,246.

The present invention relates to the art of separation from each other of seeds of different species, or seeds of the same species but differing in quality. In this art it is a matter of prime importance to separate weed seeds from those of value for planting purposes; and it is likewise highly important to separate thoroughly matured seed of strong vitality from immatured or otherwise defective seed; all to the end that seed used for planting a crop shall be not only free from weeds but shall also be of such vitality and germinating quality as to produce the best possible crop.

As a rule seeds of different species of plants differ more or less in specific gravity, and this is also true of different qualities of seed of the same species, and it has heretofore been proposed to take advantage of these differences in specific gravity in classifying the seeds, by immersing the seeds in a liquid of such specific gravity that the lighter seeds would float therein or thereon, while the heavier seeds would sink. The process and apparatus of my reissue Patents Nos. 16,981 and 17,003 are based upon this principle of gravity separation. There are, however, certain seeds of different species that are so nearly alike in size and weight as to render it difficult to effectively separate them in a gravity solution, and this is, to a large extent, true of different qualities of seed of some of the same species of plants, particularly alfalfa, the clovers and other legumes. With some kinds of seeds, such as the legumes mentioned above, the best seeds, possessing the highest vitality and therefore capable of producing the strongest growth when planted, have an exceedingly hard shell, while immature, inferior seeds of low vitality have a comparatively soft shell. The result of this is that the inferior seeds when planted absorb moisture quickly and germinate readily, while the superior seeds take a long time (even a year or more) to germinate because of their hard, moisture-resisting shell. Heretofore efforts have been made to hasten the germination of the seeds of high quality by "scarifying" such seeds, to the end that moisture essential to germination may more readily penetrate the shells. This scarification of the seed is objectionable since it is found difficult to uniformly scarify the seed—some will be over-scarified, others not enough. Furthermore, unless the high grade seeds are separated from the low grade seeds before scarification, the latter will be scarified and damaged. The advantage to the planter of pure seed of the highest vitality and germinating properties will be at once recognized, as will also the desirability of having grain, such as wheat, corn and the like, accurately graded, since the presence of inferior grains intermixed with those of superior quality inevitably lowers the price that can be obtained for the latter, whether sold for seed or food purposes.

It is an object of the present invention to provide a process and apparatus whereby seeds of different species may be effectively classified or separated from each other and seeds of the same species may be accurately graded or classified as to quality. It is further an object of the invention to provide a process and apparatus of this character that shall be capable of economic operation on a commercial scale.

With these objects in view the invention consists:

First, the invention consists of a process of separating, or classifying into separate classes, seeds whether of the same or of different species and of substantially the same specific gravity, by so treating the entire mass of seeds to be classified as to alter the relative buoyancy of the different classes, and then immersing the seeds in a liquid of such specific gravity that one class of the seeds will settle therein while seeds of another class will float thereon or therein, whereby the classes of seeds are formed into strata according to their relative buoyancy, and then separately removing the strata, each without breaking up the other stratum or strata.

The method of treating the mass of seeds to alter the relative buoyancy of the different classes of the mass depends upon the kind or kinds of seeds to be classified and their differing physical characteristics. Seeds of some species of plants absorb moisture much more readily than others, and with some species, notably the legumes, the seeds of one class, as those of immature or diseased character, absorb moisture more readily than those of another class, such as the fully matured seeds of high germinating quality. With all seeds of this general character the preferred treatment for changing the relative buoyancy of the different classes is to soak the entire mass of seeds in a liquid having a specific gravity less than that of the separating liquid to be employed, as described and claimed in my reissue Patent No. 17,003. I have discovered that, if the seeds be soaked in water at a temperature between 80° and 100° F. for a period of from fifteen to twenty-five minutes, excellent results will be secured, but it is to be expressly understood that the invention is not limited to the use of water as the soaking liquid or to the preferred temperature or duration of soaking, since these will vary with different conditions. It has been found, for example, that if alfalfa seed be soaked in water at a temperature of 90° F. for twenty minutes the immature and the diseased seeds, because of their comparatively soft shells, will absorb the water, while the best and well matured seeds, because of their hard, flinty shells, will absorb little or none. The result of this is that the relative buoyancy of the two classes of seeds is changed, and when the entire mass of seeds is immersed in a liquid whose specific gravity slightly exceeds that of water the two classes of seeds will readily separate one from the other and form strata in such liquid. Moreover, it will be found that the hard-shelled seeds of high value, that have been subjected to this soaking step, and after separation dried at a temperature of about 150° F., as hereinafter described, will germinate much quicker than seeds of the same quality that have not been so treated, and this without the previously practiced step of scarification.

While the soaking treatment is effective to change the relative buoyancy between some classes of seeds, with other classes advantage can be taken of differing physical characteristics. Thus seeds of certain species of plants have a coating, which, when wet becomes sticky or glutinous. Seeds of the plantain family, of buckhorn and of field cress are examples of this class. When it is desired to change the relative buoyancy of a mass of seeds which includes seeds of this class the mass is first wetted, whereby the coating of this class becomes sticky; the mass is then treated with a finely divided material, such as very fine sea sand, which has a specific gravity exceeding that of the sticky-coated seed being treated. The heavier material, such as the sea sand, adheres to the sticky seeds forming a cement-like coating thereon, but does not adhere to those classes of seeds which do not have the sticky coat. This effects such a change in the relative buoyancy of the two classes as to render easy the separation of a mixture of these two classes in a liquid of proper specific gravity in which the heavier, sand-coated seeds will settle, while the lighter uncoated seeds will float therein or thereon. While, as indicated above, differing physical characteristics may be taken advantage of to effect a change in the relative buoyancy of different classes of seeds preparatory to separating them by use of a gravity liquid, it will be found as a general, though not an invariable, rule, that noxious weeds and valuable farm seeds can have their relative buoyancy so altered by soaking in warm water as to render their effective separation from grain and valuable farm seeds by a proper gravity liquid an easy matter.

Second, the invention consists of a suitable tank or container having upper and lower foraminous partitions between which the seeds are introduced, and means for passing water up and down through said partitions and the seeds to wash the latter, and then removing the water while leaving the seeds between the foraminous partitions where, if desired, they can be subjected to a separating process.

Third, the invention consists in a suitable tank or container having means for introducing seeds therein, preferably from above, and means for introducing a gravity liquid, preferably from below, whereby the seeds are separated into strata, and means for removing each stratum with its enveloping gravity liquid without breaking up the remaining stratum or strata, all combined with means for removing the seed of each stratum from its enveloping liquid and then transferring the seed to a suitable drier and the liquid to a storage tank for reuse. For the purpose of removing the seed from the enveloping liquid, the seed and liquid are preferably delivered from the separating tank into a foraminous basket from which the liquid escapes to a storage tank, after which the seeds are preferably delivered to a centrifugal machine by which gravity liquid held in the mass of seeds is removed and returned to the storage tank. The seeds are then preferably sprayed with clean water, while still in the centrifugal, to recover any of the gravity liquid still adhering to the seeds, the spray water being directed from the centrifugal to a suitable tank to be used in mixing new batches of gravity liquid. From the centrifugal the washed seeds are preferably passed to a warm air drier and thence to a bagging machine.

The specific gravity of the seeds and grains to be separated in a commercial plant varies widely and the specific gravity of the separating liquid used in the separating tank has to be nicely adjusted to meet these widely varying conditions, and the invention consists, Fourth, in a separating tank, preferably on an upper floor, and a series of storage tanks, preferably on a lower floor, for gravity separating solutions whose specific gravities are graduated from that of the lowest to that of the highest required gravity, with connections from each storage tank to the separating tank (preferably through an intermediate tank), and return connections from the separating tank to each storage tank, combined with a source of power (as compressed air) for elevating the gravity liquid from the storage tanks to the separating tank, the application of the power being controlled by a selective device, as a switch, handled by the operator at the separating tank. The return of the gravity liquid from the separating tank to its proper storage tank is effected by gravity and the use of a distributing funnel in the return connections. Preferably each of the storage tanks is provided with means, as a steam coil, for heating the liquid therein, and preferably also each storage tank is equipped with a float supporting a disk of foraminous material, to prevent the returning liquid, which enters the tank at the top, from stirring up sediment in the bottom of the tank.

In some cases a straight liquid such as water or alcohol may be employed as the gravity liquid, but in commercial practice solutions, such as a salt or sugar solution are preferred, since the specific gravity of the solution may be readily controlled by the strength of the solution.

By the term "gravity liquid" as herein used is meant any liquid, whether a solution or otherwise, which is employed to stratify different classes of seeds according to their relative specific gravities.

Fifth, the invention includes a tank or other container for water, together with means for heating the water in the tank, a second tank or container for soaking seeds, connections between said tanks, a gravity separating tank connected to said soaking tank, with means whereby power, preferably compressed air, may be employed to transfer water from said water tank to said soaking tank and from the latter to said separating tank, and means for returning the water from the separating tank to the water tank or to waste, as desired. Preferably a plurality of soaking tanks are employed, each having the connections with the water and the separating tanks and selective means under the control of the operator are provided, to the end that water may be directed to any one of the soaking tanks at will, and soaked seed and water may be transferred at will from any soaking tank to the separating tank. This renders it possible to withdraw a batch of seeds from one soaking tank for treatment in the separating tank while other batches of seeds are being treated in the other soaking tanks, thus greatly expediting the operations and increasing the plant's capacity. Preferably the soaking and separating tanks are in an elevated position and the water tank on a lower level to the end that the water may be returned to the latter by gravity.

The invention further consists of certain combinations of elements and arrangement of parts, all as hereinafter more specifically described.

The apparatus embodying the invention is capable of receiving a variety of mechanical expressions, one of which is shown in the accompanying drawings, but such drawings are to be understood as illustrative only, and not as defining the limits of the invention. Likewise the methods described are capable of being carried out by a variety of forms of apparatus, while certain of the steps may be omitted without departing from the broad inventive idea of the invention as defined in the appended claims. Accordingly, while the methods and apparatus are herein described specifically and in detail, it is to be understood that such specific and detailed description is not designed to define the limits of the invention, reference being had to the appended claims for this purpose.

In said drawings:

Fig. 2 is a diagrammatic view of an elevation of a portion of Fig. 1 with the manifold shown somewhat below its proper position in order to clearly illustrate the pipes connecting the same with the several tanks;

Fig. 3 is a vertical sectional view of the separating tank;

Fig. 4 is a perspective view of one of the control valves in the separating tank;

Fig. 5 is a perspective view of the central column of the separating tank;

Fig. 6 is a perspective view of the air injecting ring in the separating tank;

Fig. 7 is a top plan view of the separating tank;

Fig. 8 is a detail perspective of the seed-receiving basket in the lower part of the separating tank and the valve controlling the same;

Fig. 9 is a perspective view of the stirrer used in the separating tank;

Fig. 10 is a seed-receiving basket below the stirrer;

Fig. 11 is a horizontal section on the line 11—11 of Fig. 10;

Fig. 12 is a vertical section through one of the storage tanks illustrating the general construction of all of said tanks;

Fig. 13 is a side elevation with parts broken away, of the top of one of the storage tanks and the motor employed for operating the valve controlling the flow of compressed air into the top of said tank;

Fig. 14 is a top plan view of Fig. 13;

Fig. 17 is an elevational view of a modified form of a portion of the apparatus.

Figure 1:
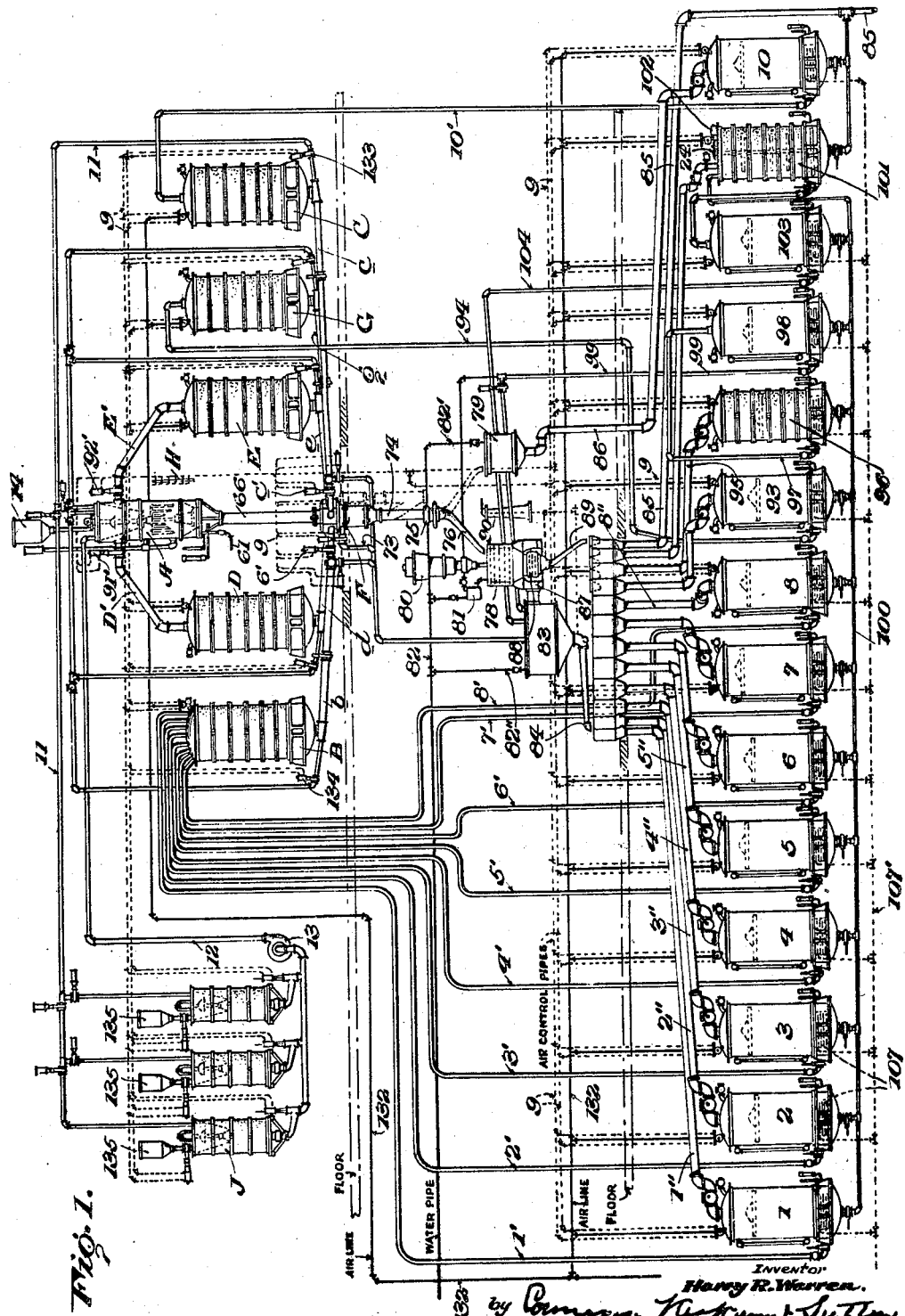
Fig. 1 is a diagrammatic elevational view of the apparatus of the invention.
Figure 15:
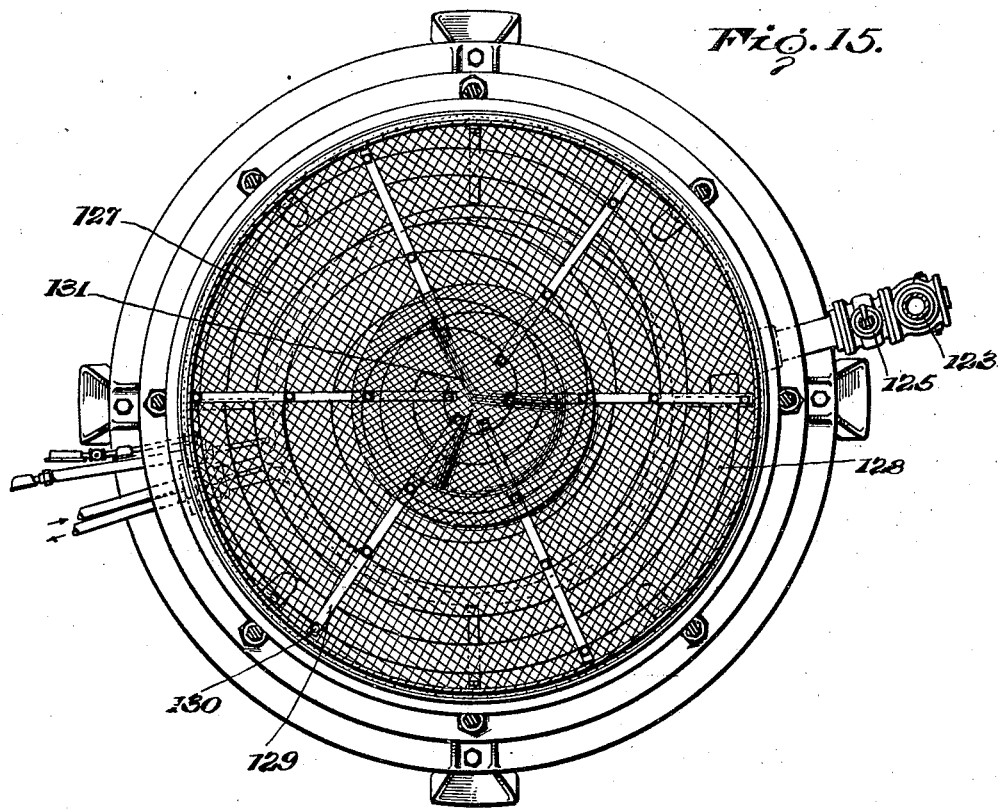
Fig. 15 is a horizontal section through Fig. 12 on the line 15—15.
Figure 16:
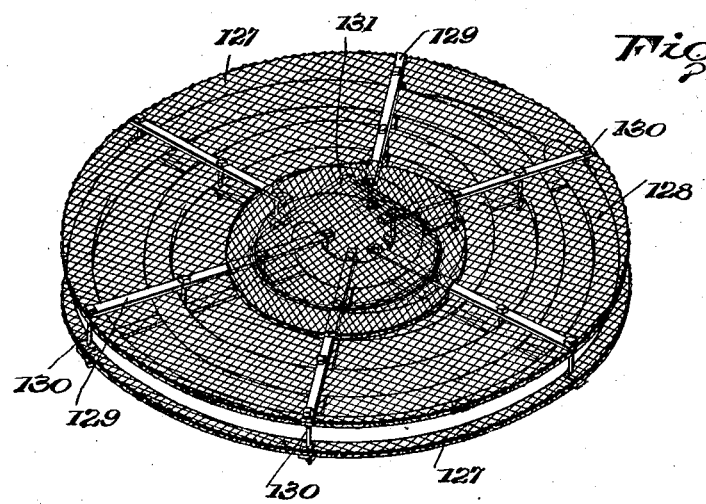
Fig. 16 is a perspective of the float employed in the majority of the storage tanks.

Like reference characters throughout the several views refer to like parts. In the preferred form of the apparatus illustrated in the drawings the separating tank, in which the seeds are separated or classified, is located at the highest point of the plant; the storage tanks for the various liquids are located on the lowest floor of the plant, and suitable power means, here shown for purposes of illustration as a compressed air system, are employed to elevate the liquid from the storage tanks when desired for use in the separating tank. This arrangement has the advantage that the liquids can be returned from the separating tank to the storage tanks by gravity; also the seeds after being separated or classified can be transferred from the separating tank by gravity to the several parts of the apparatus employed to free them from the liquid, dry them, etc.

Referring first to Fig. 2, A is a separating tank, B is a tank containing gravity liquid which tank is connected with the separating tank A to the end that the gravity liquid may be transferred from the storage tank to the separating tank and if desired returned from the separating tank by gravity to the storage tank B. C is a clear water tank, also suitably connected to the separating tank, to the end that water may be passed through the seeds for washing the same. D and E are flow tanks connected both at the bottom and the top to the separating tank A, to the end that either gravity liquid or water may be caused to flow upward through the separating tank and into the flow tanks.

F is a manifold to which the separating tank and all of the tanks B, C, D and E, as well as an additional tank G, hereinafter to be described, are connected by suitable piping, to the end that the contents of any one of these tanks may be passed to the manifold and thence to the separating tank, or from the separating tank A back to the tank from which it came or to any other of the tanks as desired, the connecting pipes being controlled by suitable gate valves, which gate valves may be, and in most cases are, controlled by a compressed air line operable from an operator's switchboard H. Tanks J, Fig. 1, are provided for soaking certain classes of seed in order to change the relative buoyancy thereof before they are transferred to the separating tank A.

For the purpose of supplying gravity liquids of varying or graduated density to the storage tank B and thence to the separating tank A, a number of gravity liquid storage tanks 1, 2, 3, 4, 5, 6, 7 and 8 are provided and are preferably located on the lower floor of the plant, each of said tanks being connected by a pipe leading from the lower portion of the storage tank to the top of the tank B, these several pipes being here designated as 1', 2', 3', 4', 5', 6', 7' and 8'. Suitable power means, here shown as a compressed air system having branches, entering the storage tanks 1 to 8 in the tops thereof, are employed to transfer the gravity liquid from the storage tanks 1 to 8 to the tank B. The operator at the switchboard H selects the particular storage tank from which he desires to transfer the gravity liquid to the tank B and effects the operation thereof through air-control pipes 9, shown in dotted lines in Fig. 1, which air-control pipes control the operation of a motor, hereinafter to be described, on the top of each storage tank. By this means the operator is enabled from his position at the separating tank to transfer from any one of the storage tanks the particular gravity liquid best suited to effect the separation of the particular class of seeds being treated in the separation tank. After said separation the gravity liquid can be returned, by gravity, through connections hereinafter to be described, to the particular storage tanks from which it was originally elevated to the tank B.

As a preliminary step to effecting the separation or classification of seeds in the separating tank, it is preferred to wash the seeds in clean water, the water being transferred, preferably by air pressure, from the tank C to the separating tank A. Likewise, when it is desired to change the relative buoyancy of seeds to be separated they are soaked in the tanks J. The water supply for the tank C and the tanks J is contained in a tank 10, preferably located on the lower floor, which tank has a pipe 10' leading from the lower portion thereof to the top of the tank C, and the latter tank is connected by suitable piping 11 leading from the lower portion thereof to the soaking tanks J. The transfer of water from the tank 10 to the tank C and from the latter to the soaking tanks J is effected by air pressure delivered at the top of the respective tanks 10 and C, which air pressure is controlled from the switchboard H through the air-control pipes 9, indicated in dotted lines in Fig. 1, in a manner exactly similar to the control of the tanks 1 to 8 inclusive. The specific mechanism for effecting this control will be hereinafter more fully described.

The seeds that are soaked in the tanks J, together with the water in which they are soaked, can be transferred from the soaking tanks J to the separating tank A through a pipe 12 suitably connected to the bottoms of the respective soaking tanks. This transfer from the soaking tanks can be effected by any suitable power means, as a pump 13, Fig. 1, which is preferably used when the soaking tanks are on a level below that of the separating tank A, as illustrated in Fig. 1. It is apparent, however, that if the soaking tanks J are located on a level above the separating tank A, this transfer of the seed and the water in which they are soaked, from the tanks J to to the tank A can be effected by gravity.

Having thus described in a general way the outline of the apparatus, a detailed description will now be given of the several parts, after which the operation of the apparatus as a whole will be set forth.

*The separating tank.*

The separating tank A, Fig. 3, is preferably in the form of a vertical cylinder to which the seeds are supplied through the top by a receiving funnel 14, and after separation the several strata leave the separating tank through a bottom port or opening 15. Preferably the bottom of the tank is in the form of an inverted, truncated cone 16 with the port 15 at the lower central portion thereof. The body of the separating tank may if desired be formed of a glass cylinder, but preferably it is a metal cylinder provided with a glass section or panel 17 through which the operator can observe the separating action within the tank, while the upper portion 18 and the lower portion 19 are preferably of metal. Supported within the upper portion of the separating tank is a seed-receiving basket 20 of foraminous material and preferably in the form of an inverted, truncated cone, the diameter of the top portion of the basket being the same as that of the interior diameter of the separating tank. A hollow column 21, Fig. 5, is suitably mounted axially within the separating tank A and is supported at its upper end by the top of said tank, and at its lower end by a spider 22 carried by the bottom 16 of the tank. A hollow shaft 23, Fig. 9, surrounds the upper portion of the column 21 and the upper end of the shaft 23 projects above the top of the column 21 and exterior to the top of the tank. This hollow shaft 23 has on its upper end a bevel gear 24 meshing with a bevel gear 25 on a motor shaft 26 of a motor 27, Fig. 7, driven by any suitable source of power, preferably by compressed air under control from the switchboard H, through control pipes 9, 9. On the lower end of the hollow shaft 23 is mounted a bar 28 provided with downwardly extending stepped paddles 29, and when the motor 27 is operated the stepped paddles are revolved within the separating tank A and serve to stir the contents thereof.

Exterior to the hollow shaft 23 and vertically slidable thereon is a sleeve 30, Fig. 4, which carries on its lower end a valve 31 of foraminous material preferably in the shape of a truncated cone, which valve acts to close the lower end of the foraminous seed-receiving basket 20 when the valve is in its lower position and which, when in its elevated position, permits the seed to escape from said basket into the lower section of the separating tank. Vertical movement is imparted to the sleeve 30 by means of the framework 32, Fig. 4, the vertical parts of which extend out through the top of the separating tank, and on the exterior of the tank are connected to a crossbar 33, which bar is connected to two cables 34 passing over suitable pulleys 35 to a crossbar 36 to which is connected a cable 37, Figs. 4 and 7, and the latter cable extends over a pulley 38 to a motor 39, which is preferably an air-controlled motor controlled from the switchboard H by the operator through the air-control pipes 9. Preferably the sleeve 30 carries near its upper portion a conical solid metal shield 40, Figs. 3 and 4, upon which the seeds, when they are received in the separating tank from the hopper 14, fall, and by which they are distributed in the basket 20, thus avoiding the collection of the seeds in a mass in one side of the basket.

The bottom of the basket 20 is supported by a horizontal partition 41, preferably of foraminous material, stiffened by radial ribs 42. The stirring blades 29 on the hollow shaft 23 are located in the tank somewhat below the partition 41, and the hollow column 21 has a series of ports 43 formed therein, which ports are covered by foraminous material 44 of such mesh as to prevent the passage of the finest seeds to be treated in the separator. The bottom of the hollow column 21 opens into the bottom portion of the separating tank and the said open end of said hollow column is provided with a valve 45, Fig. 3, which normally opens of its own weight or under the influence of the downward current of water within the hollow column, but which can be closed by an upward current of water entering the separating tank through the port 15.

Near the bottom portion of the separating tank is a foraminous basket or partition 46 in the shape of an inverted truncated cone. The upper edge of this basket is supported by the walls of the separating tank, the diameter of the basket being the same as that of the interior diameter of the tank. The lower edge of the basket 46 is supported on arms 22' of the spider 22.

Referring now to Fig. 8, 47 is a sleeve which is capable of vertical movement on the hollow column 21. A bar 48 extends transversely across said sleeve and through oppositely disposed vertical slots 49, Fig. 5, in the hollow column 21, to which bar is secured a rod 50 extending upward within the column with its upward end projecting out through the top of the separating tank, where it is connected to a cable 51 passing over pulleys 52, 53 to a motor 54, which preferably and as here shown, is an air motor controlled by the operator from the switchboard H through air-controlled pipes 9, as described in connection with other motors. Connected to the sleeve 47 is a conical valve 55, see Figs. 3 and 8, which in its lower position seats upon the lower portion of the basket 46 and closes the annular opening therethrough, but which in its upper position, shown in Figs. 3 and 8, permits the seed to flow out of said basket.

Near the top of the separating tank is a pipe, preferably in the form of a ring 56, Fig. 3, connected with a water supply pipe 57. This pipe 56 is perforated for the purpose of permitting water to be sprayed within the top of the basket 20. Below the partition 41 and above the stirring paddles 29 is another perforated pipe ring 58 having perforations both on its upper and its lower side, said ring being connected with the water pipe 59, whereby water may be sprayed into the separating tank both in an upward and in a downward direction. Immediately below the lower opening of the basket 46 is a perforated ring or pipe 60, see Figs. 3 and 6, having a valved pipe 61 leading thereto from a source of compressed air under the control of the operator of the switchboard H, by means of air-controlled pipes, not shown.

Exterior to the separating tank A is a vertical pipe 62 extending from a point just above the basket 46 to and preferably above the top of the tank, which pipe is preferably provided with a foraminous cover or top 63. This pipe 62 has two branches 62' and 62'', Fig. 3, leading from the interior of the separating tank, the branch 62' entering the tank just below the partition 41, and the branch 62'' entering the tank just above the basket 46.

Referring to Figs. 1, 2, 3, 10, and 11, F is the manifold, here shown in the form of an octagonal chamber having in each of its faces a port 64. This manifold as shown in Figs. 1 and 2, is located vertically beneath the separating tank A and on a level slightly below the tanks B, C, D, E and G, and pipes b, c, d, e and g extend from the bottom portion of each of the respective tanks each to one of the ports 64 in the manifold F. As here shown there are five of said pipes, and it will be readily understood that the other ports of said manifold, if not used for connections to other tanks, will be suitably closed. In Fig. 2 the manifold is shown in a somewhat distorted position, that is, on a level farther below the bottoms of the tanks B, C, D, E and G, than in would be in practice, the preferred position being shown in Fig. 1. Each of the pipes b, c, d, e and g is provided at a point between the respective tanks and the manifold with a gate valve interposed between the respective tanks and the manifold, as shown on Fig. 2. These gate valves control the flow of liquid from the respective tanks to the manifold, and are indicated on Fig. 2 by the reference characters b', c', d', e' and g'. These several valves are operated by compressed air motors under the control of air-control pipes 9, indicated in dotted lines on Figs. 1 and 2, leading to the switchboard H.

A pipe 66 extends from the port 15 in the bottom of the tank A vertically downward and into the manifold F, extending within the latter to near the bottom portion thereof where it is connected to a suitable foraminous basket 67 preferably of the form shown in Fig. 10. This basket is enclosed within a chamber 68 whose interior diameter exceeds that of the greatest exterior diameter of the basket, to the end that an annular space 69 is left entirely around the basket. The bottom portion of the basket 67 is preferably in the form of an inverted, truncated cone, as shown at 70, and, for the purpose of stiffening the basket at this portion, it is preferably provided with ribs 71 extending between the basket and the walls of the lower portion of the chamber 68, which is also by preference in the form of an inverted, truncated cone. A port 72, Fig. 10, is provided in the lower portion of the wall of the manifold F in a plane below the ports 64, and also in a plane below the end of the pipe 66. To this port is connected a pipe 73 by means of which liquid in the system, above the plane of the pipe 73, may be drained by gravity in a manner hereinafter described. A pipe 74 is attached to the lower end of the chamber 68 and at its bottom end is provided with a valve 75 operated by an air motor under the control of air-control pipes 9, Fig. 10, leading to an operator's switchboard at the centrifugal. Immediately below the valve 75 is a pipe or distributing nozzle 76 mounted to turn on a horizontal support 77 around a vertical axis. This distributing nozzle 76 extends downward and outward from the pipe 74 and can be swung around its vertical axis so as to bring its delivery end over a centrifugal drier 78, Fig. 1, or over a water-receiving funnel 79, as may be desired. The centrifugal drier is operated by a powerful high-speed electrical motor 80. An automatic water sprinkling device 81 is mounted in a position to spray water, when desired, into the centrifugal drier 78, the water being supplied thereto from a watermain 82, which watermain also has a branch 82' for delivering water into a funnel 79, and a branch 82'' for delivering water into a liquid-distributing funnel 83. This funnel 83 has connected to its bottom a swinging pipe 84 by means of which the liquid from the funnel 83 may be directed into the various pipes 1'', 2'', 3'', 4'', 5'', 6'', 7'' and 8'', leading to the respective tanks 1 to 8 inclusive. In like manner this pipe 84 serves to distribute liquid from the funnel 83 to the various other tanks on the lower floor, hereinafter to be described, and to the sewer or waste pipe 85. A pipe 86 leads from the funnel 79 to the water tank 10. The liquid thrown off by the centrifugal drier 78 is received in a lower chamber 87 whence it is delivered by a connecting pipe into the distributing funnel 83. When the centrifugal drier is stopped any seed that may be contained therein drops into a lower chamber 88 whence it is distributed by a distributing pipe 89 to separate funnels leading to the desired driers or other points of delivery. The distributing pipes 84 and 89 are operated from a station 90 by suitable hand-operated shaft and gearing indicated in dotted lines in Fig. 1.

The tank D has a pipe D', Fig. 1, extending from the top thereof to a port 91, Fig. 3, on the left hand side of the separating tank A, and the tank E has a pipe E' extending from the top thereof to a port 92 on the right hand side of the separating tank as shown in Fig. 3. The pipe D' is controlled by a gate valve 91', and the pipe E' is controlled by a gate valve 92', each of said valves being controlled from switchboard H through air-control pipes 9, indicated in dotted lines, as in the case of all the other valves.

The tank 93, Fig. 1, located preferably on the lower floor with the other storage tanks, is connected by a pipe 94 leading from the bottom thereof to the top of tank G, and liquid can be transferred from the tank 93 to the tank G by air pressure controlled by air-control pipes 9 leading to the switchboard H. Any special character of liquid whether water, gravity solution or otherwise, may be stored in the tank 93 and at the will of the operator transferred to the tank G, whence it may be supplied to the separating tank A as desired by the operator.

When seeds that have been treated with a gravity solution in the separating tank A are delivered to the centrifugal 78 they have a certain amount of moisture clinging thereto after all that the centrifugal can throw off or separate therefrom, and it is to wash off this additional moisture with its contained chemical forming the solution that the water spray device 81 is provided. In order to salvage any of the chemical entering into the solution that may be carried by this spray water, the latter is delivered from the centrifugal into the distributing funnel 83 whence it is delivered by the pipe 84, through the pipe 95, to a salvage tank 96, which is preferably of glass or provided with a glass panel. From this tank the salvaged solution may be transferred by air pressure through pipe 97, leading from the lower portion thereof to the top of tank 98, which acts as a re-settling or an overflow tank for the tank 96. From the tank 98 the solution may be transferred through the pipe 99 leading from the lower portion thereof to the distributing funnel 83 and by that funnel directed to any one of the storage tanks 1 to 8, as desired, for making up new solutions. By this means any waste of the solutions is entirely avoided.

All of the storage tanks 1 to 8 inclusive and tanks 93, 96 and 98 are connected through valve outlets in the bottom of said tanks with a pipe 100 leading to the top of a tank 101, Fig. 1. This tank is provided with a stirring paddle or other agitating means operated by a suitable motor 102, by means of which the sedimental matter transferred from the other tanks to tank 101 may be thoroughly stirred up with water or other liquid, and after settling, the same can be transferred by air pressure from the tank 101 to the tank 103. By this means any of the chemicals in the solutions withdrawn from the other tanks with the sediment can be salvaged, and after the solution has settled in tank 103 it can be transferred by air pressure through pipe 104 from the bottom of tank 103 to the distributing funnel 83, by which it can be distributed to any one of the solution tanks 1 to 8 inclusive, for use in the making of new solutions. Each of the tanks 1 to 8, 93, 96, 98, 103 and 10, are preferably provided with suitable heating means for the liquids contained therein, said heating means being preferably in the form of a steam heating coil which will be hereinafter described, and all of said tanks are provided with suitable thermometers and hydrometers indicating the temperature and specific gravity of the liquids contained therein.

The specific construction of these several tanks will be best understood by reference to Fig. 12. As therein shown the tank is a glass cylinder, though it is to be understood that all of the tanks on the lower level except tanks 96 and 101 may be and preferably are of sheet metal.

Referring to Figs. 12 to 16 inclusive, but first to Fig. 12, 105 indicates the bottom of the tank which may be of the concave forms shown or of inverted cone form, to the end that all of the contents of the tank may readily flow to the outlet port 106 in the bottom of the tank. Each of the storage tanks except tank 101, has a steam heating coil 107 connected to steam line 107', Fig. 1, by means of which the temperature of the solutions contained in the tanks may be raised to the desired degree. The liquid inlet pipe 108, Fig. 12, enters the tank through the top thereof and within said pipe is a one-way flap valve 109 which opens to permit the liquid to pass in entering the tank 1 and automatically closes to prevent the escape of air pressure when the latter is introduced into the tank for the purpose of transferring the liquid therefrom. On the top of the tank is also an air inlet valve 110, opening inward to prevent the formation of a vacuum within the tank but which, like the valve 109, closes under interior air pressure. The air pressure inlet pipe 111 enters the top of the tank and is controlled by a valve 112, Fig. 13, operated by an air motor 113 of any suitable construction, the air-control pipes of which latter are indicated at 114, these pipes 114 corresponding to the air-control pipes 9 indicated in dotted lines and mentioned in the preceding description. It will be understood that these air-control pipes lead to the switchboard H, whereby the operator can control the admission of air to or the exhaust of air from the motor 113. The piston rod 115 of this air motor extends outward through the opposite ends of the cylinder and carries on the forked ends thereof pulleys 116, 117. A cable 118 is connected with spring 119 at one end and passes around the pulley 116, and its other end is connected to a crankarm 120 of the valve 112. Another cable 121, is connected to a second spring 122 at one end and passes around the pulley 117 and is connected at its other end also to the crankarm 120 of the valve 112. This is a well known form of valve operating air motor and as the construction thereof forms no part of the present invention the same need not be more specifically described. Motion of the piston in one direction opens the valve 112 to admit air pressure to the tank, and movement of the piston in the reverse direction closes the valve to air pressure and opens the tank to exhaust, these movements being controlled through the admission of air to and its exhaust from the cylinder on the opposite sides of the piston through the air-control pipes 114. The outlet pipe 123 connects with the septank near the bottom thereof through a port 124 and is controlled by a gate valve 125, and by the flap valve 126 closing downward, to the end that said valve 126 will readily open to permit liquid to pass under pressure upward through said pipe but will close and prevent the return of liquid from the pipe 123 into the tank.

The liquid returning to the tank through pipe 108, if permitted to fall directly into the liquid in the tank in a large volume or unbroken stream, would be liable to stir up any sediment that had collected in the bottom of the tank, and in order to prevent this each of the tanks on the storage floor with the exception of tank 101, is provided with a float upon which the column of liquid entering the tank falls. This float should be of an open or foraminous material, and preferably is in the form of two disks of foraminous material 127, Figs. 15 and 16, of approximately the same diameter as the interior diameter of the tank, and having between them suitable means for floating the disks on the surface of the liquid. As here shown, this flotation means consists of a coil or pipe 128 closed at each end, the pipe being preferably formed in a spiral coil, as will be readily understood from an inspection of Figs. 15 and 16. Preferably the disks 127 of foraminous material are secured to the coil of pipe by radiating ribs 129 above and below the disks and secured together by suitable bolts 130. Preferably also the float is provided in its central portion with a conical member 131 of foraminous material which receives the column of liquid when it is delivered into the tank and serves to separate and break the same, this still further contributing to the desired end, viz, avoiding the stirring up of the sediment in the bottom of the tank.

Referring to Fig. 1, it will be observed that the air main 132 is connected by suitable branch lines with all of the storage and other tanks on the lower level and also with each of the tanks B, C, D, E and G, and furthermore, the valves controlling the flow of liquid from the tanks B, C, D, E and G are likewise controlled by air pressure pipes 9, leading to the switchboard H. Still further, the control of the flow of the contents of tanks J therefrom is controlled by air-control pipes also leading to the switchboard. This places the control of all of the tanks in the plant absolutely under the hand of the operator at the switchboard.

It will further be observed that the water-main pipe 82 has branches leading therefrom to the funnels 79 and 83 and also to the water supply 81 for the centrifugal 78.

*Operation.*

Let it be assumed that the seed to be separated has been introduced into the separating tank A through the funnel 14 and received in the basket 20. It will be spread or distributed in said basket by the spreader 40 and will fall upon the upper surface of the foraminous valve 31 which, being open, will permit the seed to descend between the space between the partitions 41 and the basket 46, the valve 55 being closed. If it is desired to wash the seeds before they are separated, water is introduced into the tank 10 from the water pipe 82 through the branch pipe 82′, funnel 79 and pipe 86. Preferably the water is heated in the tank 10 through the medium of the steam coil in the bottom of the tank, and, the gate valve adjacent said tank in the pipe 10' being open, air pressure is admitted through the branch air line entering the top of tank 10 and the water is forced through the pipe 10' into the tank C, the valve c' in the pipe c being closed as also the valve 133 in the pipe 11 near the bottom of said tank C. By opening the valve c' and admitting air pressure to the top of the tank C, water is transferred from said tank through the pipe c, the manifold F and the pipe 66 into the separating tank A. If it is desired to have the water flow upward through the seed the valve 92' in the pipe E' is opened and the valve 91' in the pipe D' is closed, and the water is delivered from the separating tank into the tank E. On the other hand, it may be desired to have the water in the separating tank surge up and down through the seeds confined between the partition 41 and the basket 46, it being understood of course that the valves 31 and 55 are closed. In this case the valves 91' and 92' are closed and air pressure is admitted to the tank C, and the water forced through the manifold up into the separating tank; the air pressure being then released from the tank C, the water rushes backward into the tank C and, upon pressure being reapplied to the last-named tank, the water is again forced into the separating tank A, this operation continuing as long as desired. When the seed is washed to the desired extent, pressure is relieved from the tank C and the water flows out of the separating tank A into the tank C through the pipe 66, the manifold F and the pipe c. The valve c' is then closed and there will remain a certain amount of water in the pipe 66, the manifold F and the chamber 68. This water can be drained out by turning the pipe 76 to deliver into the funnel 79, whence the water is returned through pipe 86 to tank 10.

The operator, having previously determined by laboratory experiment or otherwise the particular density of the gravity liquid necessary to be employed in the separation of the particular class of seeds under treatment, selects the gravity liquid of the proper density from one of the tanks 1 to 8 inclusive, for example, tank 4. The gate valve 125, Fig. 12, of said tank being open, air pressure is applied by the operator through the switchboard control to the top of tank 4 and the liquid therein is forced upward through the pipe 4' and delivered into the top of tank B, the valve b' being closed, as also the valve 134 in the pipe leading from said tank B. The operator then, from the switchboard, opens valve b' in the pipe b and also admits air under pressure to the top of the tank B, thereby forcing the gravity liquid in said tank through the pipe b', manifold F and the riser pipe 66 upward into the separating tank A through the bottom thereof.

The mass of seeds contained between the partition 41 and the basket 46 being a mixture of seeds of different specific gravities, the lighter seeds will tend to rise in the gravity liquid while the heavier seeds will tend to settle therein, but as the seeds are in a mass, the settling seeds are liable to obstruct the rise of some of the lighter seeds, and likewise the lighter seeds are liable to obstruct the settling of some of the heavier seeds. In order to permit all of the seeds to seek the level in the liquid corresponding to their respective specific gravities, this preliminary stratification of the light and the heavy seeds must be broken up. This can be accomplished by releasing the pressure in the tank B and permitting the liquid to surge back into said tank; then reapplying the pressure and forcing the liquid upward again into the separating tank. Furthermore, this separation may be facilitated by setting the stirring paddles 29 into operation, and by injecting compressed air through the pipe 61 and the perforated ring 60 immediately under the basket 46. This action of the compressed air not only serves to agitate the seeds in the system, breaking up the preliminary stratifications which would obstruct the complete separation of the seeds according to their specific gravities, but it also tends to free the seeds from air bubbles which under some circumstances are liable to cling to the individual seeds, thereby altering the specific gravity of the body. Any one or all three of these means for agitating the mass of seeds and breaking up the preliminary stratification may be employed.

This breaking up of the preliminary stratification having been carried to a sufficient degree to enable the lighter seeds to rise and the heavier seeds to settle in the gravity liquid, the said liquid in the separating tank A is permitted to become quiescent, when it will be found that the heavy seeds whose specific gravity exceeds that of the gravity liquid employed will settle to or towards the basket 46, while the lighter seeds will stratify at or near the surface of the gravity liquid, assuming this surface to be below the partition 41. In some instances an intermediate stratum between the upper and the lower strata will be formed of seeds that are approximately of the same specific gravity as that of the separating liquid employed.

The stratification of the seeds as above described having become complete, the strata are removed one at a time, each with its enveloping liquid, that is, with that portion of the liquid in the separating tank immediately surrounding the particular stratum to be removed. By opening the cone-shaped valve 55 the heavier seeds in the basket 46 will descend out of said basket through the pipe 66 into the foraminous basket 67 and the chamber 68. Valve 55 is then closed. It will be understood that the pipe 66, the manifold, the chamber 68 and the pipe 74 down to the valve 75, are filled with the gravity liquid. All of this liquid above the port 72 in the lower portion of the manifold F can be drained out by opening the gate valve in the pipe 73 and permitting the liquid to flow therethrough to the funnel 83 and thus be directed by the swinging pipe 84 through return pipe line 4″ to the tank 4, from which it was originally taken. When this is accomplished the pipe 76 is turned into the position shown in Fig. 1 and the valve 75 opened, whereupon the seed in the foraminous basket 67 and the liquid in the chamber 68 surrounding said basket, flow through the pipe 76 into the centrifugal machine as it is being driven at a high speed by the motor 80. The liquid is thrown off by the centrifugal, while the seed, by reason of centrifugal action, is retained therein, the liquid flowing to funnel 83 and thence back to the tank 4. The swinging pipe 84 is then turned so as to direct liquid from the funnel 83 into the salvage tank 96 and water is sprayed from the container 81 onto the seed in a rapidly revolving centrifugal, thereby washing from the seed any of the gravity liquid still adhering thereto. This water, with such of the gravity liquid as is washed from the seed, is delivered into the tank 96.

Seeds having been washed free from the gravity liquid, the swinging pipe 89 is adjusted to direct seed therethrough to any suitable drier or other point of delivery desired, and the centrifugal stopped, whereupon the seed fall, by gravity, through and are delivered by the swinging pipe 89.

As soon as the lowermost stratum of seed has all been delivered from the basket 46 the valve 55 is closed, thus preventing any stratum thereabove from passing downward until the first stratum has been disposed of, as above described, after which the next stratum, which is now the lowest stratum in the separating tank A, is permitted to pass into the basket 67 as just described in connection with the first stratum. This operation is continued, stratum after stratum, until all of the strata into which the mass of seeds has been divided, are disposed of.

As before stated, it is sometimes desired to separate different classes or species of seeds which are of substantially the same size and specific gravity and which, therefore, if treated in the separating tank in their natural state, would not separate by gravity. Before introducing such seeds into the separating tank therefor, it is desirable to subject the seed to treatment for changing the relative buoyancy of the different classes of seeds constituting the mass to be separated.

As above indicated, one method effecting this change in the relative buoyancy in the mass of seeds is that of soaking the seeds, whereby one class of seeds readily absorbs the liquid in which the seeds are soaked, whereas another class of seeds being more impervious to the soaking liquid, do not readily absorb the same. The result of this is that the relative buoyancy of the two classes of seeds is changed so that one of them will rise in a gravity liquid of the proper density, while the other class will settle therein. For this purpose the tanks J are provided, into which the seeds are introduced through hoppers 135. Water from tank 10, preferably heated to a temperature between 85° and 165° F. is then elevated by air pressure and introduced from the tank 10 to the tank C. The valve c′ is then closed and the valve 133 is opened and air pressure is introduced to the tank C, thereby forcing water through the pipe 11 to the tanks J, suitable valves being employed, as indicated, to direct the water to the particular one of these tanks desired. The seeds are then permitted to soak in the warm water in the tanks J, preferably for a period of from fifteen to twenty-five minutes, and are then transferred from the tanks J through the pipe 12 and delivered into the top of the separating tank A. This transfer may be effected by any suitable power means, depending somewhat upon the location of the tank, and as here shown the pump 13 is employed for this purpose, but it will be readily understood that if the tanks J were elevated above the separating tank A such transfer might be effected by gravity.

The soaked seeds, together with the liquid, preferably water in most instances, in which they are soaked, having been transferred into the separating tank A and delivered between the partition 41 and the perforated basket 46 in which latter they are held by the closed valves 31 and 55, the water is drained out through the pipe 66, the manifold F, the pipe 74 and the swinging pipe 76 into the funnel 79 and thence by way of the pipe 86 to the tank 10. This having been accomplished the proper gravity liquid is then selected by the operator and the seeds treated as heretofore described.

If desired the gravity liquid used in separating the seeds may be permitted to flow upward through the mass of seeds and, the valve 92′ being closed and the valve 91′ opened, passes through the pipe D′ into the tank D.

Either the water that is permitted to flow into the tank E or the gravity liquid into the tank D can be forced therefrom by way of the manifold F and the pipe 66 into the separating tank and can be caused to surge back and forth in the tank, as heretofore described, or be drained therefrom and returned to the particular storage tank from which it originated.

When the salvaged liquid has been gathered in the tank 96 and settled therein, it may be transferred by air pressure delivered through the top of said tank and by way of pipe 97 into the storage salvage tank 98. This is useful either in order to permit a resettling and hence more effectual clarification of the salvaged liquid; or, if the amount of salvaged liquid becomes greater than the capacity of the tank 96 the tank 98 furnishes an additional storage space therefor.

When it is desired to make up a new batch of gravity liquid in any one of the tanks 1 to 8 inclusive, the salvaged liquid from the tank 98 may be transferred therefrom by air pressure through the pipe 99 and directed into the funnel 83, from which it may be directed to any one of the tanks 1 to 8 desired.

As heretofore described, the bottoms of the respective storage tanks are all so formed as to receive and collect sediment from said tanks in the bottoms thereof, and the bottoms of all of these tanks are directly connected with a pipe 100, the connections being controlled by suitable valves. Whenever the sediment that is collected in any one of the tanks is desired to be removed therefrom the valve in said connection is opened and the sediment forced out, under air pressure admitted to the tank, into the pipe 100 by which it is delivered to the top of the sediment tank 101. This tank is provided with agitating means in the form of stirring paddles for thoroughly stirring up the sediment which is then allowed to settle in said tank, and the gravity liquid of value is then transferred by air pressure from tank 101 to tank 103, the sludge or waste material of the sediment in tank 101 being then withdrawn from the bottom of the tank into the waste or sewer pipe 85. The liquid recovered in tank 103 can be forced by air pressure through the pipe 104 and delivered into the funnel 83 from which it can be distributed to any one of the tanks 1 to 8 desired.

In some cases it may be desired to use a peculiar gravity liquid out of the usual or the ordinary, or to have ready for various purposes in connection with the separation, a liquid other than the gravity solutions and the water as heretofore described. There is, therefore, provided a tank 93 which can be utilized to contain any desired liquid whether water or other liquid or a solution of any desired strength. This tank is connected by pipe 94 directly with tank G, and the liquid from the tank 93 can be transferred by air pressure, as in the other cases, to the tank G. From the tank G the liquid contained therein is available for use in any of the other tanks B, C, D and E, or any one of the tanks 1 to 8 inclusive.

When one batch of seeds has been separated and is to be followed by a batch of different kind, it is highly important to entirely free the separating tank from any of the seeds of the previous batch that might adhere therein. This is accomplished by spraying water into the basket 20 and the interior of the tank A through the perforated water ring 56, and also by spraying water through the perforated water ring 60 below the partition 41, this spray water being directed through the funnel 83 either to the water tank 10 or to the waste pipe 85 as desired.

When it is desired to have the liquid in the separating tank A flow downward and out of the tank while a mass of seeds is held in the basket 46, the seeds are liable to pack in the basket and obstruct the ready flow of the liquid from the separating tank. In order to avoid this the column 21 is provided with the perforations 43, which perforations are covered by foraminous material 44, the openings through which are small enough to retain the finest seeds to be treated. When the liquid is flowing out through these perforations 43, the valve 45 automatically opens by reason of its weight and the downward flow and permits the downward flow of the liquid. On the other hand, when there is an upward current of the liquid flowing into the separating tank, said upward current acts to close the valve 45, thus forcing the liquid upward through the perforated basket 46.

The pipe 62 with its connecting branches 62', 62" and opening to the atmosphere at 63, permits the ready entrance of air to the separating tank and exit therefrom, thereby permitting the ready movement of the currents of liquid as desired into or through the separating tank.

It will be observed that the operation of the valves 31 and 55 in the separating tank, as well as the flow of liquids into and from said tank, are all controlled by the operator at the switchboard immediately adjacent said tank. This tank having, as before described, a section composed of glass, the operator is enabled to readily observe the action taking place therein and can therefore be guided in the various operations; can tell when to break up preliminary stratifications; when to permit the water to become quiescent; when to permit the bottom stratum to pass from the tank; and in fact is in a position to intelligently control the entire operation of the device.

The apparatus thus far described contemplates the removal of each stratum, after the same is formed in the gravity liquid, from the separating tank through the bottom thereof. In some instances, however, it may be found preferable to remove the upper stratum, or a plurality of the upper strata from the top, rather than taking the same out through the bottom, and a modified form of apparatus which will accomplish this result is shown in Fig. 17, in which A' is a separating tank, F is the manifold, 67 the foraminous basket below the manifold in the chamber 68, all as heretofore described. The interior construction of the separating tank A' is, or may be, also similar to that shown in Fig. 3. A conduit 136 leads from the manifold on a level just below the partition 41 and in a downward direction and connects with the pipe 137 leading into a foraminous basket 67' within a chamber 68'. The upper stratum of seed can be delivered through the conduit 136 and the pipe 137 via the perforated basket 67' and the chamber 68' to the centrifugal 78. The seeds delivered through the conduit 136 and the pipe 137 are the lighter, more trashy forms of seed and the same are liable to clog, particularly at the point of delivery from the pipe 137 into the basket 67', and for the purpose of breaking up such clogging masses water can be directed into the pipe 137 near the point of delivery into the basket 67', said water being drawn from a tank 138 through pipe 139, which pipe is controlled by a valve 140, as will be readily understood.

If desired, a stratum of seed from a point lower than that where the conduit 136 enters the separating tank may be delivered into the pipe 137 through a conduit 141, as shown in dotted lines on Fig. 17. Each of the conduits 136 and 141 is provided with a suitable valve, not shown, to control the flow therethrough; and it will be observed that upon opening the valve controlling either one of these conduits the gravity liquid enveloping the stratum at that level will flow out, by gravity, through the conduit carrying with it the seed forming the stratum at that level.

By removing the upper stratum in the manner just described in connection with Fig. 17, the separation of a given mass of seeds is greatly expedited, since the seeds of the upper stratum can be removed and be treated through the basket 68', and immediately thereafter the lower stratum of seeds in the basket 46 can be withdrawn into the basket 67 and separated from its enveloping liquid. Actual experience has demonstrated that the time necessarily employed in the separation of a batch of seeds can thus be shortened by from forty to fifty per cent.

The method and the apparatus hereinbefore described afford means whereby mixtures of different kinds or classes of seeds can be expeditiously and effectively separated with a minimum expenditure of power and labor. Experience has taught that mixtures of seeds can be separated from their various classes by this method and process with approximately one hundred per cent accuracy and at minimum expense.

While the method to be followed and the apparatus employed has been herein described specifically and in detail, it is to be expressly understood that such specific and detailed description is for the purpose of clearly describing the invention and is not designed to indicate the limits of the invention, reference being had to the appended claims for this purpose.

What is claimed is:

1. The method of separating a mixture of seeds of different classes which consists in soaking the mixture in a liquid, whereby the relative buoyancy of the different classes of seeds is altered, then immersing the soaked mixture in a liquid whose specific gravity is greater than that of one of the classes of soaked seeds and less than that of another class of such seeds, whereby the different classes are divided into strata, then removing the upper stratum by gravity, and then removing the remaining strata serially beginning with the bottom stratum, and each without breaking up the stratum or strata thereabove.

2. A method of separating a mixture of different classes of seeds which includes the steps of soaking the mixture in a liquid at a temperature above 85° F., and then stratifying the seeds in a gravity liquid.

3. A method of separating a mixture of different classes of seeds which includes the steps of soaking the mixture for from fifteen to twenty-five minutes in a liquid at a temperature of from 85° to 165° F., and then stratifying the seeds in a gravity liquid.

4. The method of separating a mixture of seeds of different classes which consists in separating the classes of seeds into different strata by gravity in a liquid, then removing the top stratum with its enveloping liquid by gravity and then removing by gravity the bottom stratum with its enveloping liquid.

5. A method of separating a mixture of seeds of different classes which comprises the steps of separating the mixture into its different classes in a gravity liquid, draining the gravity liquid enveloping each class therefrom, and then washing from each class the remaining gravity liquid adhering thereto.

6. The method of separating a mixture of seeds of different classes which consists in subjecting the seeds, while in a container, to reverse currents of water to wash the same, then subjecting the seeds to the action of a gravity liquid, injecting compressed air into the gravity liquid in the presence of the seeds, allowing the gravity liquid to become quiescent, whereby the seeds are stratified therein, then removing the strata one at a time by gravity.

7. The method of separating a mixture of seeds of different classes which consists in washing the seeds, then immersing them in a gravity liquid, causing the gravity liquid to surge up and down, whereby the strata of seeds forming therein are broken up, then permitting the gravity liquid to become quiescent and the seeds to stratify therein, and then removing the strata one at a time by gravity.

8. The method of separating a mixture of seeds of different classes which consists in immersing them in a gravity liquid and permitting them to preliminarily stratify therein, then breaking up the strata, then permitting them to restratify, and then removing the strata one at a time by gravity.

9. The method of separating a mixture of seeds of different classes which consists in confining the mixture between foraminous partitions in a container, passing a gravity liquid up and down in said container, then permitting said liquid to become quiescent and the seed to stratify therein, then removing the strata one at a time, each with its enveloping liquid, and then separating the seed from the enveloping liquid.

10. The method of separating a mixture of seeds of different classes which consists in confining the mixture between foraminous partitions in a container, passing a gravity liquid up and down in said container, then permitting said liquid to become quiescent and the seed to stratify therein, and then flowing off the strata one at a time.

11. The method of separating a mixture of seeds of different classes which consists in confining the mixture between foraminous partitions in a container, passing a gravity liquid up and down in said container, then permitting said liquid to become quiescent and the seed to stratify therein, then flowing off the top stratum, and then flowing off the remaining strata one at a time each of the latter strata being removed in advance of the one immediately above it.

12. The method of separating a mixture of seeds of different classes which consists in immersing the mixture in a gravity liquid of approximately 95° F., permitting the seeds to stratify therein, and then flowing off the strata one at a time each with the gravity liquid enveloping the same.

13. The combination of a separating tank, a plurality of storage tanks, liquid-conveying connections from each storage tank to the separating tank, power means for transferring liquid from each storage tank to the separating tank, and selective devices adjacent the separating tank and controlling said power means, whereby the operator at the separating tank can select at will the storage tank from which liquid is transferred to the separating tank.

14. The combination of a separating tank, a plurality of storage tanks, liquid-conveying connections from each storage tank to the separating tank, a return connection from the separating tank to each storage tank, power means for transferring liquid from each storage tank to the separating tank, and selective devices adjacent the separating tank and controlling said power means, whereby the operator at the separating tank can select at will the storage tank from which liquid is transferred to the separating tank and the liquid can be returned to any storage tank desired.

15. The combination of a separating tank, a plurality of storage tanks, an intermediate tank, connections from each of said storage tanks to said intermediate tank and from the latter to the separating tank, power means for transferring liquid from each storage tank to the intermediate tank and from the latter to the separating tank, and means under the control of the operator and adjacent the separating tank for directing the application of said power means.

16. The combination of a separating tank, a plurality of storage tanks, connections leading from the lower part of each storage tank to the bottom of the separating tank, connections leading from the bottom of the separating tank to the top of each storage tank, and power means for moving liquid from each storage tank to the separating tank.

17. The combination of a tank, a foraminous partition in the upper portion thereof, a foraminous partition in the lower portion of the tank, each of said partitions having a valve-controlled opening therein, whereby seed may be admitted through said upper partition and discharged through the lower partition, and means below the lower partition for admitting liquid to and discharging it from said tank.

18. In a seed separating apparatus, the combination of a separating tank, means for introducing a charge of seed therein, and means introducing liquid into said tank, with a chamber located on a level below said tank, a foraminous seed-receiving basket in said chamber, a conduit extending from said tank to said basket, and means for draining liquid from said chamber.

19. In a seed separating apparatus, the combination of a separating tank, and means for introducing seed and a liquid into said tank, with a chamber located on a level below said tank, a foraminous seed-receiving basket in said chamber, a conduit leading from said tank to said basket, a centrifugal drier, and a conduit leading from said basket to said drier.

20. In a seed separating apparatus, the combination of a separating tank and means for introducing seed and liquid into said tank, with a chamber on a level below said tank, a foraminous seed-receiving basket in said chamber, and a conduit leading from the bottom portion of said tank to said basket.

21. In a seed separating apparatus, the combination of a separating tank and means for introducing seed and liquid into said tank, with a chamber on a level below said tank, a foraminous seed-receiving basket in said chamber, and a conduit leading from the upper surface level of the liquid in said tank to said basket.

22. In a seed separating apparatus, the combination of a separating tank and means for introducing seed and liquid into said tank, with a chamber on a level below said tank, a foraminous seed-receiving basket in said chamber, a conduit leading from the bottom portion of said tank to said basket, a second seed-receiving basket, and a conduit leading from the upper surface level of the liquid in said tank to said last-named basket.

23. In a seed separating apparatus, the combination of a separating tank, a plurality of tanks on a level below said separating tank, a manifold below the level of said last-named tanks, separate conduits connecting each of the lower tanks and said manifold, and a conduit connecting the separating tank and the manifold.

24. In a seed separating apparatus, the combination of a separating tank, a plurality of tanks on a level below said separating tank, a manifold below the level of said plurality of tanks, separate conduit connecting each of the lower tanks and said manifold, a conduit connecting said separating tank and the manifold, and power means for transferring liquid from the lower tanks to the separating tank through said manifold.

25. In a seed separating apparatus, the combination of a separating tank, a storage tank and a flow tank, with a manifold, connections from each of said tanks to the manifold, a conduit leading from the separating tank to the flow tank, and power means for transferring liquid from the storage tank through said manifold and the separating tank to the flow tank, and power means transferring liquid from the flow tank through said manifold to the separating tank or the storage tank as desired.

26. In a seed separating apparatus, the combination of a separating tank, a storage tank on a level below the same and having a depressed sediment-receiving bottom, means for heating the liquid in the storage tank, a foraminous float in said storage tank, liquid-conveying connections leading from the lower part of said storage tank to the separating tank, power means for transferring liquid from the storage tank to the separating tank, and return connections from the separating tank to the top of the storage tank.

27. In a seed separating apparatus, a tank for liquid, an exit pipe therefrom, a non-return valve in said pipe, a liquid-conveying pipe leading into the top of said tank, an inwardly opening valve in said last-named pipe, and means supplying compressed air to said tank.

28. In a seed separating apparatus, a separating tank, a vertical column centrally disposed in said tank, a foraminous partition in the upper portion of said tank and having a central port therethrough, a sliding sleeve surrounding said column, a valve carried by said sleeve and controlling said port, and means imparting sliding movement to said sleeve.

29. In a seed separating apparatus, a separating tank, a centrally disposed column in said tank, a hollow shaft surrounding said column, stirring paddles on said shaft, means for revolving the shaft, a foraminous partition above said paddles, said partition having an annular port around said column, a sleeve sliding on said shaft, a valve carried by said sleeve and controlling said port, and means imparting sliding movement to said sleeve.

30. In a seed separating apparatus, a separating tank, a centrally disposed hollow column in said tank, a foraminous partition in the lower portion of said tank, said partition having an annular port surrounding said column, a sleeve surrounding said column, a valve carried by said sleeve and controlling said port, a connection leading from said sleeve upward within said column, and means imparting vertical movement to said connection to operate said valve.

31. In a seed separating apparatus, a separating tank, a centrally disposed vertical column in said tank, an upper and lower foraminous partition in said tank, each partition having an annular port surrounding said column, a sleeve surrounding the upper part of said column, a valve on said sleeve controlling the port in the upper partition, a sleeve surrounding the lower part of said column, a valve on said last-named sleeve controlling the port in the lower partition, and means imparting independent movement to said sleeves.

32. In a seed separating apparatus, a separating tank, a centrally disposed vertical column in said tank, a foraminous funnel-shaped partition surrounding said column and having an annular port in the bottom thereof, a sliding sleeve surrounding said column, a valve on the lower end of said sleeve and controlling said port, a cone-shaped seed spreader on the upper portion of said sleeve, and means imparting sliding movement to the sleeve.

33. The method of separating a mixture of seeds of different classes some of which have a sticky surface when subjected to moisture, which consists in wetting the mixture then coating the sticky-surfaced seeds with a material whose specific gravity is greater than that of the seeds, and then stratifying the seeds in a gravity liquid.

34. The method of separating a mixture of seeds of different classes some of which have a sticky surface when subjected to moisture, which consists in wetting the mixture then coating the sticky-surfaced seeds with sand, and then stratifying the seeds in a gravity liquid.

35. The method of separating a mixture of seeds of different classes, some of which have a sticky surface when subjected to moisture, which consists in wetting the mixture, then coating the sticky-surfaced seeds with a material whose specific gravity differs from that of the seeds, and then stratifying the seeds in a gravity liquid.

36. In a seed separating apparatus, the combination of a water-storage tank, means for heating the water therein, a seed-soaking tank and a seed-separating tank, means for transferring water from the storage tank to the seed-soaking tank, and means transferring seed and water from the soaking tank to the separating tank.

In testimony whereof I have signed this specification.

HARRY R. WARREN.